United States Patent [19]

Swindal et al.

[11] 4,405,970
[45] Sep. 20, 1983

[54] SILICON-GLASS-SILICON CAPACITIVE PRESSURE TRANSDUCER

[75] Inventors: James L. Swindal, East Hampton; Daniel H. Grantham, Glastonbury, both of Conn.

[73] Assignee: United Technologies Corporation, Hartford, Conn.

[21] Appl. No.: 310,598

[22] Filed: Oct. 13, 1981

[51] Int. Cl.³ .............................................. H01G 7/00
[52] U.S. Cl. ..................................... 361/283; 73/718; 73/724
[58] Field of Search ................... 361/283; 73/718, 724

[56] References Cited

U.S. PATENT DOCUMENTS 3,634,727  1/1972  Polye ................................... 361/283
3,965,746  6/1976  Rabok ................................... 73/718
4,168,517  9/1979  Lee ....................................... 361/283
4,287,553  9/1981  Braunlich ........................... 361/283

Primary Examiner—Elliot A. Goldberg
Attorney, Agent, or Firm—M. P. Williams

[57] ABSTRACT

A silicon capacitive pressure transducer 34 comprising two wafers of silicon 14, 32 separated by borosilicate glass 18, 21, one of the wafers 14 having a borosilicate glass pedestal 26 thereon which is metallized 30 to provide one plate of a capacitor, the other plate of which is the surface of one of the silicon wafers 32. The distance between the upper surface of the glass pedestal and the lower surface of the silicon wafer is defined by a portion 18 of the borosilicate glass, the portion 21 of borosilicate glass being the same height as that of the glass pedestal 26. An embodiment of a transducer 34b employs a silicon pedestal 26b, wherein the glass portion 21b only provides separation of the silicon wafers 14b, 32b with lower parasitic capacitance.

4 Claims, 11 Drawing Figures

SILICON-GLASS-SILICON CAPACITIVE PRESSURE TRANSDUCER

TECHNICAL FIELD

This invention relates to capacitive pressure transducers of the type in which a pair of silicon pieces are joined together with borosilicate glass by a field-assisted bonding process, to form an evacuated capsule with opposing conductive surfaces forming the plates of a pressure-variable capacitance, electrical connection to which is made through the bulk of the silicon.

BACKGROUND ART

Pressure transducers are known to take a variety of forms. One form relies on the pressure-induced deflection of a thin diaphragm. In the case of a capacitive pressure transducer, the diaphragm deflection causes a variation in the distance between a pair of surfaces which form the plates of a variable capacitor. In U.S. Pat. No. 3,634,727, there is disclosed a capacitor formed of two wafers of silicon insulated from each other by glass and joined together by a low temperature glass or by brazing thin metal films deposited on the glass. The device disclosed in said patent requires the processing of two wafers of silicon to provide only a single transducer, and the method of joining the two wafers of silicon is cumbersome. In order to process wafers to provide a large number of pressure transducers from a single pair of processed wafers, a suitable joining technique must be utilized. One such is the use of field-assisted bonding in which a layer of borosilicate glass between the two pieces of silicon permits bonding of the silicon with the borosilicate glass at about 500° C. in a vacuum, the silicon pieces being totally attracted to one another by a DC electric field established by on the order of 100 or 200 volts impressed between them, described in NASA Tech Brief B74-10263, January 1975, entitled "Low-Temperature Electrostatic Silicon-To-Silicon Seals Using Sputtered Borosilicate Glass". The device in the aforementioned patent also suffers from a very low ratio of variable capacitance to parasitic fixed capacitance inasmuch as the periphery of the device has conductive closer to each other than the surfaces of the deflectable portion of the device.

In order to improve the variable to fixed capacitance ratio, and particularly to mitigate the parasitic fixed capacitance (that part which is not varied as a function of diaphragm flexure in response to pressure changes), it is necessary to provide topographical shaping, such as moats, pedestals or pistons, to cause the relatively movable capacitive plate portions to be close to each other in contrast with the fixed portions of the conductive body of the device. Additionally, in the event that very small devices are made (such as by large scale integrated circuit processing of wafers to form a plurality of devices per wafer pair), the small area of the opposed capacitive plates requires close spacing in order to have an adequate capacitance for desired sensitivity to pressure.

In mass production of silicon capacitive pressure transducers utilizing known microcircuit and thin film technology, particularly where small devices are desired and capacitor plate surface spacing becomes very small, it is necessary that the processes be selected and performed in such a fashion as to control dimensions very accurately. If, for instance, a pedestal or piston is too tall, short circuiting can result in a bad device; is a pedestal or piston is too short, then an inadequate capacity or variable capacitance as a function of pressure may result.

DISCLOSURE OF INVENTION

Objects of the invention include provision of improved dimensional control in the processing of wafers for making miniature silicon capacitive pressure transducers, and reduction of parasitic fixed capacitance in miniature silicon capacitor pressure transducers.

According to the present invention, silicon capacitive pressure transducers, in which the silicon provides conductivity to opposing capacitor plates, the distance and therefore the capacitance between which is variable as a result of deflection in response to external pressure changes, the parasitic, fixed capacitance of the nonvariable portion of the device is significantly reduced by spacing conductive portions thereof with borosilicate glass.

In accordance with the present invention, control over the dimensions of topography of one or more wafers being processed to provide silicon capacitive pressure sensor is achieved by utilizing the depth of sputtered borosilicate glass as the principal dimension defining step, in contrast with the etching of silicon or other material to a time-controlled depth.

According to a first aspect of the present invention, two pieces of silicon, upon which are disposed closely spaced opposing surfaces of a capacitor, the spacing of which varies with external pressure, are separated about the peripheral fixed capacitive portion by borosilicate glass. In accordance further with the present invention, the borosilicate glass is deposited and etched in process steps resulting in principal dimensional control between the two pieces of silicon so as to provide relatively accurate dimensional control in contrast with etching of silicon or other materials.

The invention may be practiced in silicon pressure transducers of a wide variety of types with or without metallization of borosilicate glass or silicon to form capacitive plates, to provide low parasitic capacitance and acceptably accurate dimensional control in the processing thereof.

The invention may be practiced utilizing microcircuit and thin film technology which is well within the skill of the art, in the light of the teachings which follow hereinafter.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
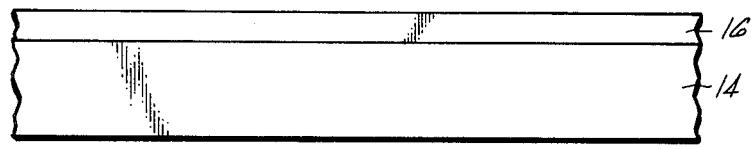
FIGS. 1-9 are simplified side elevation, sectional views of one or more silicon wafers being processed to form exemplary silicon capacitive pressure transducers in accordance with the invention.
Figure 2:
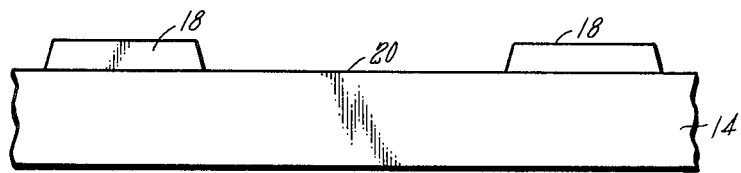
Figure 3:
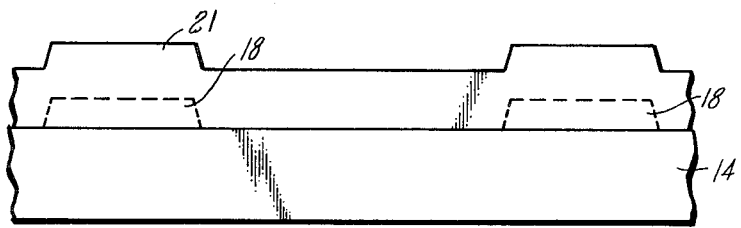
Figure 4:
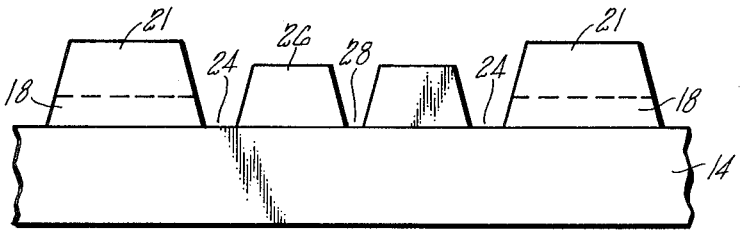

Referring now to FIG. 1, a wafer 14 of doped silicon has a layer 16 of borosilicate glass deposited thereon. The silicon may be either N or P type having at least $10^{15}$ impurity per cc so as to achieve something under 1 ohm centimeter conductivity. The borosilicate glass 16 may, for instance, be Corning 7070 Glass, or other borosilicate glass such as "Pyrex". The glass 16 may be RF sputtered utilizing well known techniques so as to achieve a depth on the order of 2.5 microns. In FIG. 2, well known photoresist and etch techniues are utilized to etch the glass layer 16 so as to provide a matrix 18 of glass defining a plurality of circular sites 20 of exposed surface of the silicon wafer 14, at each of which a pressure transducer is to be formed as described hereinafter. As shown in FIG. 3, a next stop is to deposit additional borosilicate glass in a layer 22 on the order of 6 microns thick. Then, as shown in FIG. 4, conventional photoresist and etch techniques are utilized to etch the layer 22 so as to result in a thickened matrix 18, 21 defining annular moats 24 and circular pedestals 26 with centrally disposed apertures 28 therein, the apertures 28 and moats 24 exposing the upper surface of the silicon wafer 14. The deposition depth of the glass layer 16 and the glass layer 22 provide dimensional control of the thickness of the matrix 18, 21 (FIG. 4) and the circular pedestals 26, in accordance with one aspect of the invention, as described more fully hereinafter.

Figure 5:
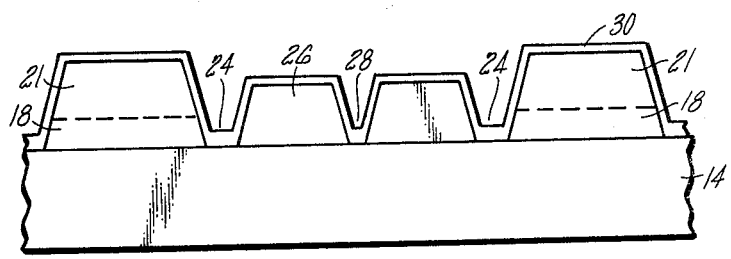
Figure 6:
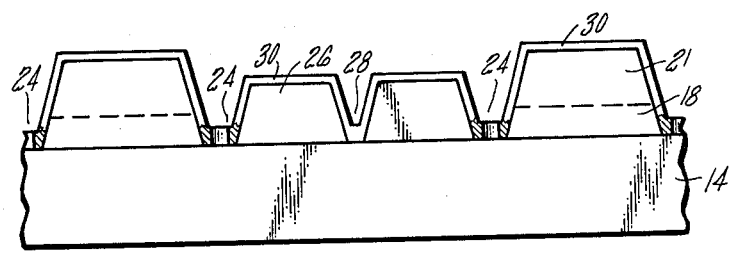
Figure 7:
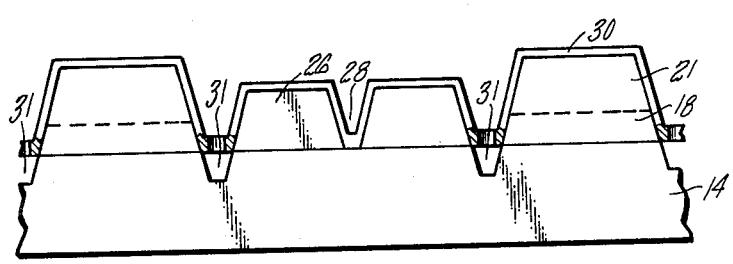
Figure 8:
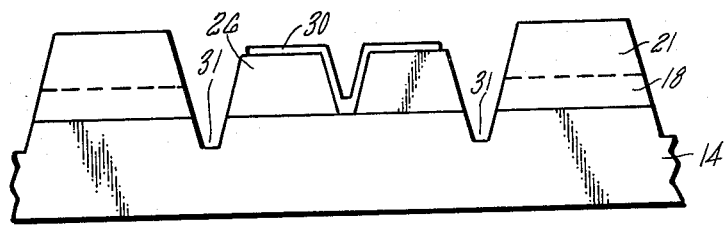
Figure 9:
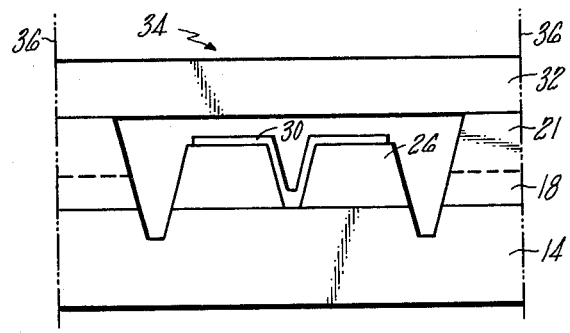

In FIG. 5, a layer of aluminum, on the order of 5,000 angstroms thick, is RF sputtered or evaporated using electric beam or resistance methodology, to provide a mask for further etching of the silicon and to provide a capacitor plate, as described hereinafter. In FIG. 6, utilizing well known photoresist and etch techniques, the aluminum layer 30 is etched away at the bottom of each of the moats 24. Then, the silicon wafer 14 is plasma etched so as to deepen the moats in each of the sites on the wafer to provide a circular moat 24a which extends into the silicon. Notice that the etching of silicon as illustrated in FIG. 7 does not change the dimensional difference between the height of the circular pedestals 26 and the matrix 18, 21. Thus, the particular depth of the etch need concern only leaving sufficient material between the moat 24a and the lower surface of the silicon wafer 14 for the desired structural strength, and/or the desired pressure responsive flexure characteristics, as described hereinafter. As illustrated in FIG. 8, ordinary photoresist and etch techniques are utilizing to remove only a portion of the aluminum mask which had been deposited in the step illustrated in FIG. 5, so as to provide a conductive surface on the top of the borosilicate glass circular pedestals 26. In this step, the glass in the matrix 18, 21 and the silicon at the base of the annular moats 24a provide etch stops so that there is no dimensional change as a consequence of removing the unwanted aluminum. FIG. 8 illustrates the completion of processing of one of two wafers so as to provide a plurality of sites at which the capacitive pressure transducers can be formed. The next step is to overlay the processed wafer of FIG. 8 with a wafer 32 of conductive silicon, on the order of 250 microns thick, as illustrated in FIG. 9, and bond the wafers together. The field-assisted bonding may take place in a vacuum of about $10^{-6}$ Torr at approximately 500° C., with a voltage, impressed plus to minus from the wafer 32 to the wafer 14, of on the order of 75 to 125 volts. This causes the silicon wafers to be attracted to each other as the glass 18a bonds to the wafer 32, thus ensuring a pressure tight seal at each of the sites of the processed wafer 14. Then, the wafer may be diced appropriately, as shown by the dash lines 36 in FIG. 9, such as by sawing, to provide a plurality of individual pressure transducers 34.

Referring to FIG. 9, because the glass portion 21 around the periphery of the device is formed during the same deposition as the pedestal 26 (the deposition of glass layer 22 in FIG. 3), regardless of how thick the layer 22 is made, the top of the pedestal 26 will be separated from the bottom of the wafer 32 by the thickness of the glass portion 18 which in turn is determined by the thickness of the layer 16 (FIG. 1). Thus dimensional control, in providing a prescribed distance between the silicon pedestal 26 and the lower surface of the silicon wafer 32, is maintained simply by proper control of the deposition of layer 16. Of course, the plate-to-plate spacing will be less, as determined by the thickness of the metal layer 30. On the other hand, the distance between the silicon wafer 14 and the silicon wafer 32 is independently controllable by the thickness of the layer 22 (FIG. 3) and therefore the glass portions 21 and the pedestal 26. The sputtering of glass can be controlled in the thickness of ±5% of desired thickness, even in high volume production. This contrasts with etching of silicon (e.g., such as to create the moat 24 and pedestal 26 from a thick wafer), for which the depth of etching (other than when using a metallic etch stop) and only be controlled to ±15% of the desired depth. This dimensional control is one aspect of the present invention. It should be noted however, that the amount of glass used (the thickness of the layer 22, in particular) cannot be increased indiscriminately, because the difference in the temperature coefficient of expansion of borosilicate glass from that of conductive, single crystal silicon, could result in structural flaws occurring as a result of temperature changes in a device when in use. But, for a minimum parasitic capacitance, the glass wall structure 18, 21 should be at least four times as great as the distance between the plates (30, 32).

Figure 10:
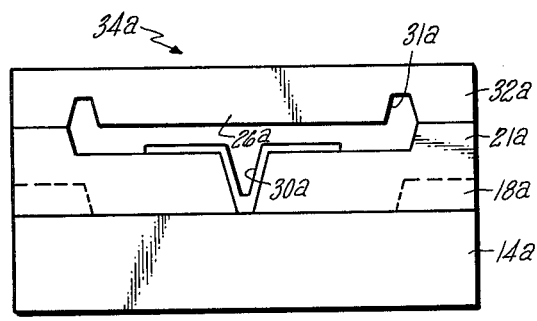
FIGS. 10 and 11 are simplified side elevation views of alternative embodiments of silicon pressure transducers employing the present invention.

Another embodiment of the present invention is illustrated in FIG. 10. This is substantially the same as that illustrated in FIG. 9 with the exception of the fact that a moat 31a is formed in the upper wafer 32a rather than within the glass 21a in the lower wafer 14a. Obvious variations in the procedures set forth in FIGS. 1–9 would be utilized to form the device of FIG. 10, the most notable difference being the etching back of the aluminum to form the metallic plate surface and contact 30a, a similar aluminum mask being utilized in the process to form the moat 31a in the wafer 32a. The embodiment of FIG. 10 may be advantageous where a piston 26a having high mobility is desired for extreme sensitivity.

Figure 11:
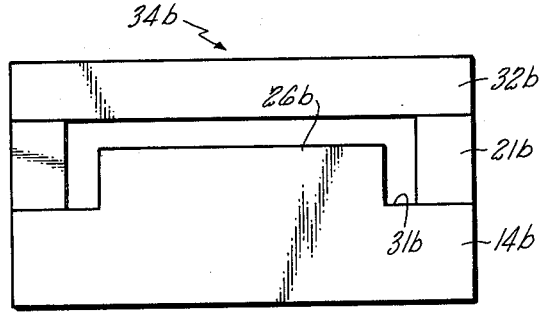

In another embodiment employing one aspect of the invention as illustrated in FIG. 11, the glass material 21b is utilized to define the spacing between the wafer 14b and the wafer 32b, but the distance between the upper surface of a pedestal 26b and the lower surface of the wafer 32b is wholly dependent on the depth of etch of silicon in formulating that which becomes a moat 31b after the glass 21b is disposed and reverse etched thereon. Thus, the embodiment of FIG. 11 does not have the accurate dimension control of the spacing of the capacitor plates, but does employ the aspect of the invention where the two wafers are separated significantly by the glass portion 21b, thereby to reduce the parasitic static capacitance around the periphery of the device.

In the embodiments of FIGS. 9 and 10, one of the plates of the capacitor is formed of the metallization 30, 30a, wherein in the embodiment of FIG. 11, both plates of the capacitor are formed by the surfaces of the silicon pieces 14b, 32b. In the embodiments of FIGS. 10 and 11, a pedestal 26a, 26b is formed of silicon only, whereas in the embodiment of FIG. 9 the pedestal 26 is formed at least in part of glass. In all three embodiments, however, the silicon pieces are joined together and separated by glass having a dimension between the two pieced (vertically in the figures herein) which is substantially larger than the distance between the two capacitor plates. In fact, it has been found that the glass wall structure which provides the sidewalls to the evacuated chamber formed between the two pieces of silicon should have a dimension between the pieces of silicon (vertical in the figures) which is at least four times greater than the spacing of the capacitive plates. This provides a substantial reduction in the invariable, parasitic capacitance between the plates around the periphery, while the close spacing between the plates provides for an increase in the dynamic range (the variable capacitance portion of the total capacitance) as a function of pressure.

The invention may be practiced in a wide variety of configurations utilizing pistons which are either movable or relatively rigid, with double moats or single moats, and employing other features as well in a wide variety of shapes and sizes. However, for best results in the field-assisted bonding step, the glass should all be on one wafer so that the seal formed during bonding is a silicon/glass seal. Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. A silicon, capacitive pressure transducer comprising:
   a first piece of conductive silicon having disposed thereon a pedestal, said pedestal having a conductive surface;
   a second piece of conductive silicon having a conductive surface thereon; and
   a wall of glass joining said first piece of silicon with said second piece of silicon and providing a chamber between said pieces and said wall, the conductive surface on said pedestal being spaced a short distance from the conductive surface of said second piece of silicon, forming the plates of a capacitor, said distance and therefore the capacitance of said capacitor varying in response to changes in fluidic pressure external to said transducer, the length of said wall between said pieces of silicon being at least four times greater than the distance between said capacitor plates.

2. A transducer according to claim 1 wherein said pedestal is formed by depositing glass on said first silicon piece and providing a conductive layer on the glass at the top surface of said pedestal, said conductive layer being connected through said glass pedestal for electrical connection with said first silicon piece.

3. A transducer according to claim 2 wherein said glass wall structure includes a first portion equal to the distance between the top of the glass pedestal and the opposing surface of said second piece of conductive silicon and a second portion equal in dimension to the height of said pedestal.

4. A transducer according to claim 1 wherein said pedestal is formed within said first silicon piece, the conductive surface on the top of said pedestal comprising the conductive surface of said first piece of conductive silicon; and wherein said glass wall structure has a dimension separating said two piece of conducting silicon which is equal to the summation of the height of said pedestal and the distance between the surface of said pedestal and the conductive surface of said second piece of conductive silicon.

* * * * *